US012569931B2

(12) United States Patent
Chou et al.

(10) Patent No.: US 12,569,931 B2
(45) Date of Patent: Mar. 10, 2026

(54) MATERIAL MODIFICATION PROCESSING DEVICE AND CAVITY FORMING METHOD

(71) Applicant: INDUSTRIAL TECHNOLOGY RESEARCH INSTITUTE, Hsinchu (TW)

(72) Inventors: Fu-Lung Chou, Tainan (TW); Chien-Jung Huang, Tainan (TW); Yu-Chung Lin, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 448 days.

(21) Appl. No.: 18/085,657

(22) Filed: Dec. 21, 2022

(65) Prior Publication Data

US 2024/0173795 A1 May 30, 2024

(30) Foreign Application Priority Data

Nov. 30, 2022 (TW) .................................. 111146031

(51) Int. Cl.
B23K 26/06 (2014.01)
B23K 26/03 (2006.01)
(Continued)

(52) U.S. Cl.
CPC ........ B23K 26/0648 (2013.01); B23K 26/032 (2013.01); B23K 26/38 (2013.01);
(Continued)

(58) Field of Classification Search
CPC .. B23K 26/0648; B23K 26/032; B23K 26/38; B23K 26/402; B23K 2103/54;
(Continued)

(56) References Cited

U.S. PATENT DOCUMENTS

| 8,673,167 B2 | 3/2014 | Shimoi et al. |
| 8,741,777 B2 | 6/2014 | Shimoi et al. |
| | (Continued) | |

FOREIGN PATENT DOCUMENTS

| CN | 104968620 B | 6/2018 |
| CN | 106560269 B | 2/2020 |
| | (Continued) | |

OTHER PUBLICATIONS

WO-2022166650-A1, Machine Translation. (Year: 2025).*
(Continued)

*Primary Examiner* — Duy Vu N Deo
*Assistant Examiner* — Christopher Remavege
(74) *Attorney, Agent, or Firm* — Troutman Pepper Locke LLP; Tim Tingkang Xia, Esq.

(57) ABSTRACT

A cavity forming method includes the steps of: providing the material modification processing device; according to the cavity topography of the workpiece, utilizing the material modification processing device to perform local modification including: calculating the laser-light shaping and scanning information, and based on the laser-light shaping and scanning information to have the optical axis adjustment unit to adjust positions of the laser-light shaping and scanning processing module and the processing stage, such that the area of the workpiece to be projected by the Bessel beam can be formed as the modified area; and, etching the modified area to form a cavity of the cavity topography. In additional, a material modification processing device is also provided.

6 Claims, 8 Drawing Sheets

(51) Int. Cl.

| | |
|---|---|
| *B23K 26/064* | (2014.01) |
| *B23K 26/38* | (2014.01) |
| *B23K 26/402* | (2014.01) |
| *B23K 103/00* | (2006.01) |

(52) U.S. Cl.

CPC ........ *B23K 26/402* (2013.01); *B23K 2103/54*
(2018.08); *B23K 2103/56* (2018.08)

(58) Field of Classification Search

CPC .. B23K 2103/56; B23K 26/082; B23K 26/00;
B23K 26/362

See application file for complete search history.

(56) References Cited

U.S. PATENT DOCUMENTS

| | | | | |
|---|---|---|---|---|
| 2014/0027951 | A1 | 1/2014 | Srinivas et al. | |
| 2018/0342451 | A1 * | 11/2018 | Dahlberg | B23K 26/06 |
| 2020/0376603 | A1 * | 12/2020 | Ortner | B23K 26/0613 |
| 2022/0314364 | A1 * | 10/2022 | Shim | B23K 26/40 |
| 2022/0347796 | A1 * | 11/2022 | Liu | G02B 27/0938 |
| 2023/0201960 | A1 * | 6/2023 | Hu | B23K 26/082 |
| | | | | 219/121.75 |
| 2023/0339042 | A1 * | 10/2023 | Leslie | B23K 26/55 |
| 2024/0009764 | A1 * | 1/2024 | Kaiser | B23K 26/0652 |

FOREIGN PATENT DOCUMENTS

| | | | | | |
|---|---|---|---|---|---|
| CN | 112192325 | A | * | 1/2021 | ........ B23K 26/0648 |
| CN | 112496532 | A | | 3/2021 | |
| CN | 114160965 | A | | 3/2022 | |
| CN | 114364484 | A | | 4/2022 | |
| CN | 115138997 | A | * | 10/2022 | ........... B23K 26/064 |
| EP | 3335826 | A1 | * | 6/2018 | ........... B23K 26/361 |
| JP | 2015054348 | A | * | 3/2015 | ........... H01L 21/486 |
| TW | I454331 | B | | 10/2014 | |
| TW | 201703912 | A | | 2/2017 | |
| TW | I604907 | B | | 11/2017 | |
| TW | I648117 | B | | 1/2019 | |
| TW | I678342 | B | | 12/2019 | |
| TW | 202039134 | A | | 11/2020 | |
| TW | 202212036 | A | | 4/2022 | |
| WO | WO-2021122894 | A1 | * | 6/2021 | ............ B23K 26/50 |
| WO | WO-2022166650 | A1 | * | 8/2022 | ........... B23K 26/362 |

OTHER PUBLICATIONS

CN-112192325-A, Machine Translation (Year: 2025).*
CN-115138997-A, Machine Translation. (Year: 2025).*
EP-3335826-A1, Machine Translation. (Year: 2025).*
JP-2015054348-A, Machine Translation. (Year: 2025).*
WO-2021122894-A1, Machine Translation. (Year: 2025).*
Taiwan Patent Office, "Office Action", Oct. 11, 2023, Taiwan.
Vijay Sukumaran et al., Design, Fabrication, and Characterization
of Ultrathin 3-D Glass Interposers With Through-Package-Vias at
Same Pitch as TSVs in Silicon, IEEE Transactions on Components,
Packaging and Manufacturing Technology, vol. 4, No. 5, 2014.
Li Chen et al., Development of Laser-Induced Deep Etching Process
for Through Glass Via, 20th International Conference on Electronic
Packaging Technology, 2022.
Rafael Santos et al., Processing Glass Substrate for Advanced
Packaging using Laser Induced Deep Etching, 2020 IEEE 70th
Electronic Components and Technology Conference (ECTC), 2020.

* cited by examiner

S100

S110 — Provide a material modification processing device

S120 — Based on the desired cavity topography for the workpiece, utilize the material modification processing device to perform local modification S130 — Etch the modified area so as to form a cavity in accordance with the cavity topography

MATERIAL MODIFICATION PROCESSING DEVICE AND CAVITY FORMING METHOD

CROSS REFERENCE TO RELATED APPLICATION

This application claims the benefits of Taiwan application Serial No. 111146031, filed on Nov. 30, 2022, the disclosures of which are incorporated by references herein in its entirety.

TECHNICAL FIELD

The present disclosure relates in general to a material modification processing device and a cavity forming method.

BACKGROUND

In response to future network technology needs such as Internet of Things (IoT), artificial intelligence (AI) and machine learning have created the rapid growth of ultra-large data centers. Currently, a typical large-scale data center usually utilizes a 100 Gbps Ethernet infrastructure to carry out long-distance data transmission. In the future, it can be expected that the data center will require a data-transmission speed up to 800 Gbps, and thus a qualified optical fiber connector for a future ultra-large data center shall have a lower signal loss than the one. In particular, the qualification in return loss to a fiber connector for long-distance data transmission is even much stricter. For example, recently, a market need in the fiber connector with angled physical contact (APC) featured in low return loss has risen rapidly to meet the rapid growth of the optical communication equipment market.

In the art, the APC connectors are manufactured mainly by a semiconductor etching process, including a yellow-light development and plasma dry etching to form required special-shaped holes. In the yellow light process, five steps thereof are required, including steps of: defining upper and lower holes, dry-etching the upper and lower holes, cutting, and grinding the edges into 8°-angled ends. In addition to the long production time, the cost of the photo mask is not cheap. Importantly, in the aforesaid steps, the formulation of the angular ends is one of major factors to provide design performance to the connector. Thus, how to formulate the end face with corresponding angles is definitely one of the important issues in producing the APC connectors.

In addition, different products may require different shapes of cavities, and thus correspondingly different manufacturing processes for the required shapes of the products shall be prepared. Obviously, to provide different processes to meet different shapes of products is cumbersome, time-consuming and also costly. Therefore, how to provide a material modification processing device and cavity forming method that can respond to different shapes is definitely urgent and important to the skill in the art.

SUMMARY

In one embodiment of this disclosure, a material modification processing device includes a processing stage, a light source, a laser-light shaping and scanning processing module, an optical axis adjustment unit and a calculating unit. The processing stage is configured to place thereon a workpiece. The light source is used for emitting a laser beam. The laser-light shaping and scanning processing module, disposed between the processing stage and the light source, has sequentially an axicon, a first focusing lens, a biaxial scanning element and a second focusing lens, the biaxial scanning element including a first reflector and a second reflector, the first reflector and the second reflector being separated by a first distance, the first focusing lens and the biaxial scanning element being separated by a first focusing distance, the second focusing lens and the biaxial scanning element being separated by a second focusing distance, the laser beam sequentially passing through the axicon, the first focusing lens, the biaxial scanning element and the second focusing lens to form a Bessel beam. The optical axis adjustment unit is connected with the laser-light shaping and scanning processing module. The calculating unit is signally connected with the processing stage and the optical axis adjustment unit. According to a cavity topography of the workpiece, a laser-light shaping and scanning information is calculated; wherein, according to the laser-light shaping and scanning information, the optical axis adjustment unit is to adjusted positions of the laser-light shaping and scanning processing module and the processing stage so as to have an area of the workpiece to be projected by the Bessel beam to form a modified area.

In another embodiment of this disclosure, a cavity forming method includes the steps of: providing the material modification processing device; according to the cavity topography of the workpiece, utilizing the material modification processing device to perform local modification including: calculating the laser-light shaping and scanning information, and based on the laser-light shaping and scanning information to have the optical axis adjustment unit to adjust positions of the laser-light shaping and scanning processing module and the processing stage, such that the area of the workpiece to be projected by the Bessel beam can be formed as the modified area; and, etching the modified area to form a cavity of the cavity topography.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
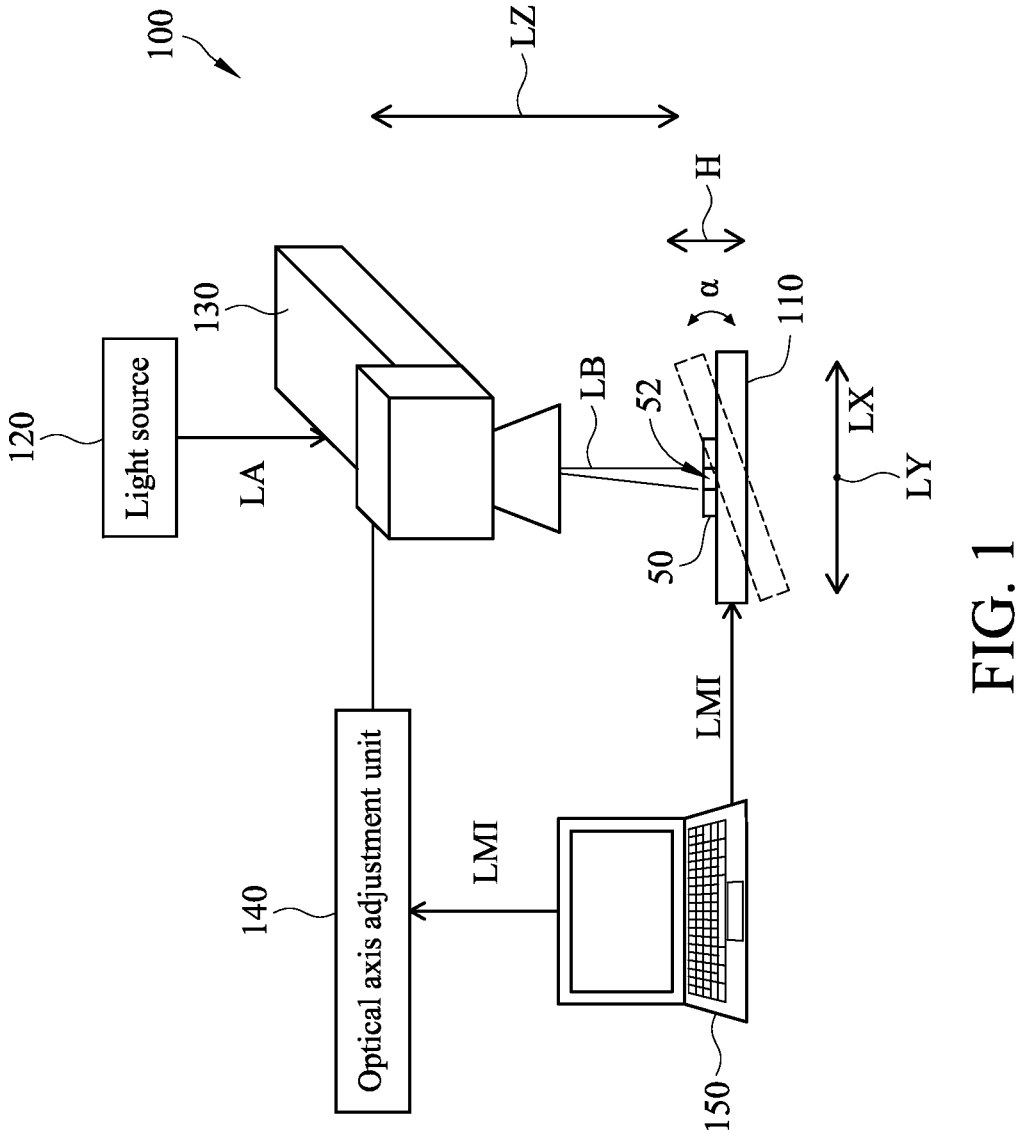
FIG. 1 is a schematic view of an embodiment of the material modification processing device in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the following description, terms such as "include", "comprise", and "have" mentioned in this disclosure are all open terms, which means "include but not limited to".

In the description of various embodiments, when terms such as "first" and "second" are used to describe elements, they are only used to distinguish these elements from each other, and do not limit the order or importance of these elements. In addition, the directional terms mentioned in the present disclosure, such as "first direction", "second direction", and "processing direction", are only used to refer to the directions of the drawings, and are not used to limit the present disclosure.

In the description of various embodiments, the so-called "coupling" or "connection" may refer to two or more elements being in direct physical or electrical contact with each other, or indirect physical or electrical contact with each other, and "coupling" Connecting" or "connecting" may also mean that two or more elements operate or act with each other.

FIG. 1 is a schematic view of an embodiment of the material modification processing device in accordance with this disclosure. As shown, the material modification processing device 100 includes a processing stage 110, a light source 120, a laser-light shaping and scanning processing module 130, an optical axis adjustment unit 140 and a calculating unit 150. The laser-light shaping and scanning processing module 130 is disposed between the processing stage 110 and the light source 120. The optical axis adjustment unit 140 is connected with the laser-light shaping and scanning processing module 130. The calculating unit 150 is signally connected with the processing stage 110 and optical axis adjustment unit 140.

The processing stage 110 is configured to place thereon a workpiece 50. In this embodiment, the workpiece 50 can be glass, silicon carbide, or any hard brittle material transparent to a laser wavelength. The processing stage 110 can have an inclined angle α, which is an oblique angle rising from a plane expanded by a first direction LX and a second direction LY. In FIG. 1, the inclined angle α is lied on a plane perpendicular to, but including, the first direction LX. As shown, the first direction LX, the second direction LY and the processing direction LZ stand individually for different directions. By having an XYZ coordinate system for example, the first direction LX can be the X direction, the second direction LY is the Y direction, and the processing direction LZ can be the Z direction.

The light source 120 is used to emit a laser beam LA to the laser-light shaping and scanning processing module 130, in which the laser beam LA has a wavelength ranging from 0 to 11 μm and an energy density between 0.05 $J/cm^2$ to 0.1 $J/cm^2$. After passing through the laser-light shaping and scanning processing module 130, the laser beam LA would become a Bessel beam LB with a scan function. In this embodiment, a ratio of a depth of field (DOF) of the laser-light shaping and scanning processing module 130 to a thickness of the workpiece 50 shall be greater than 1.2 at least, such that an axial energy distribution of the Bessel beam LB from the laser-light shaping and scanning processing module 130 can cover at least a modified area of the workpiece 50. As such, processing integrity can be ensured. In this embodiment, the thickness of the workpiece 50 is measured at the workpiece 50 in a thickness direction H, in which the thickness direction H is parallel to the processing direction LZ.

Figure 2:
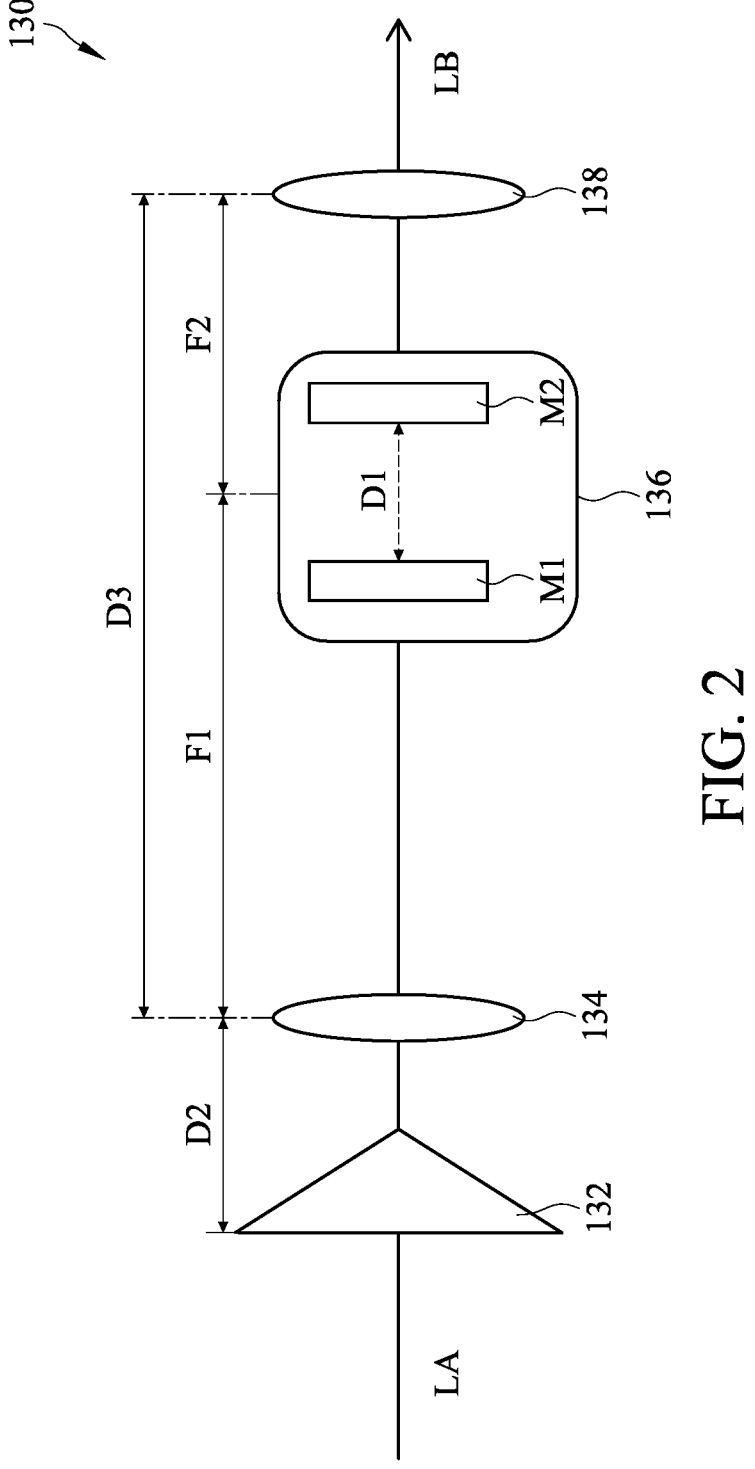
FIG. 2 is a schematic view of an embodiment of the laser-light shaping and scanning processing module of FIG. 1.

FIG. 2 is a schematic view of an embodiment of the laser-light shaping and scanning processing module of FIG. 1. As shown, the laser-light shaping and scanning processing module 130 is sequentially furnished with an axicon 132, a first focusing lens 134, a biaxial scanning element 136 and a second focusing lens 138. The biaxial scanning element 136 includes a first reflector M1 and a second reflector M2 spaced from the first reflector M1 by a first distance D1 ranging from 10 mm to 100 mm. The axicon 132 is spaced from the first focusing lens 134 by a second distance D2 ranging from 50 mm to 300 mm. The first focusing lens 134 and the second focusing lens 138 are separated by a third distance D3 ranging from 6 mm to 500 mm. The first focusing lens 134 and the biaxial scanning element 136 are separated by a first focusing distance F1 ranging from 50 mm to 300 mm. The biaxial scanning element 136 and the second focusing lens 138 are separated by a second focusing distance F2 ranging from 10 mm to 200 mm. The first focusing lens 134 and the first reflector M1 are separated by a distance of F1–D1/2, and the second reflector M2 and the second focusing lens 138 are separated by a distance of F2–D1/2. By having the first reflector M1 and the second reflector M2 to be disposed on a front focal plane of the second focusing lens 138, such that the Bessel beam LB passing through the second focusing lens 138 would be given a feature of telecentricity. Namely, during the scanning, the Bessel beam LB won't be inclined, but kept vertically to the surface of the workpiece 50, for example to keep in the thickness direction H.

Upon such an arrangement of the laser-light shaping and scanning processing module 130, the laser beam LA would pass sequentially through the axicon 132, the first focusing lens 134, the biaxial scanning element 136 and finally the second focusing lens 138 to form a Bessel beam LB. In comparison to the conventional Bessel beam, this disclosure has the laser beam LA to be scattered after passing through the axicon 132, and then collected and focused to form the Bessel beam LB after passing through the first focusing lens 134 and the second focusing lens 138, such that the laser energy of the Bessel beam LB can be decayed quickly to zero, since the Bessel beam LB provided in this disclosure is formed by a diverging-and-converging process. Thus, while the Bessel beam LB is introduced to modify the workpiece 50, the laser energy residual phenomenon would be reduced, a smoother surface at the workpiece 50 would be contributed by the Bessel beam LB, and thus possible crack after etching can be effectively avoided.

Referring back to FIG. 1, the calculating unit 150 can be a controller. After retrieving the stored programs or instructions, the calculating unit 150 would count on the cavity topography formed by the workpiece 50 to calculate corresponding laser-light shaping and scanning information LMI. Based on the laser-light shaping and scanning information LMI, the optical axis adjustment unit 140 can adjust positioning of the laser-light shaping and scanning processing module 130 and the processing stage 110, so that an area of the workpiece 50 projected by the Bessel beam LB would become a modified area 52.

In one embodiment, according to the laser-light shaping and scanning information LMI, the optical axis adjustment unit 140 would adjust the position of the laser-light shaping and scanning processing module 130 in the processing direction LZ, such that the focus of the Bessel beam LB at the workpiece 50 on the processing stage 110 can be adjusted.

In one embodiment, according to the laser-light shaping and scanning information LMI, the processing position of the workpiece 50 can be adjusted by displacing the processing stage 110 in the first direction LX or the second direction LY. In another embodiment, according also to the laser-light shaping and scanning information LMI, the inclined angle of the processing stage 110 can be adjusted so as to give the workpiece 50 an inclined angle for altering the incident angle of the Bessel beam LB with respect to the workpiece 50.

Figure 3:
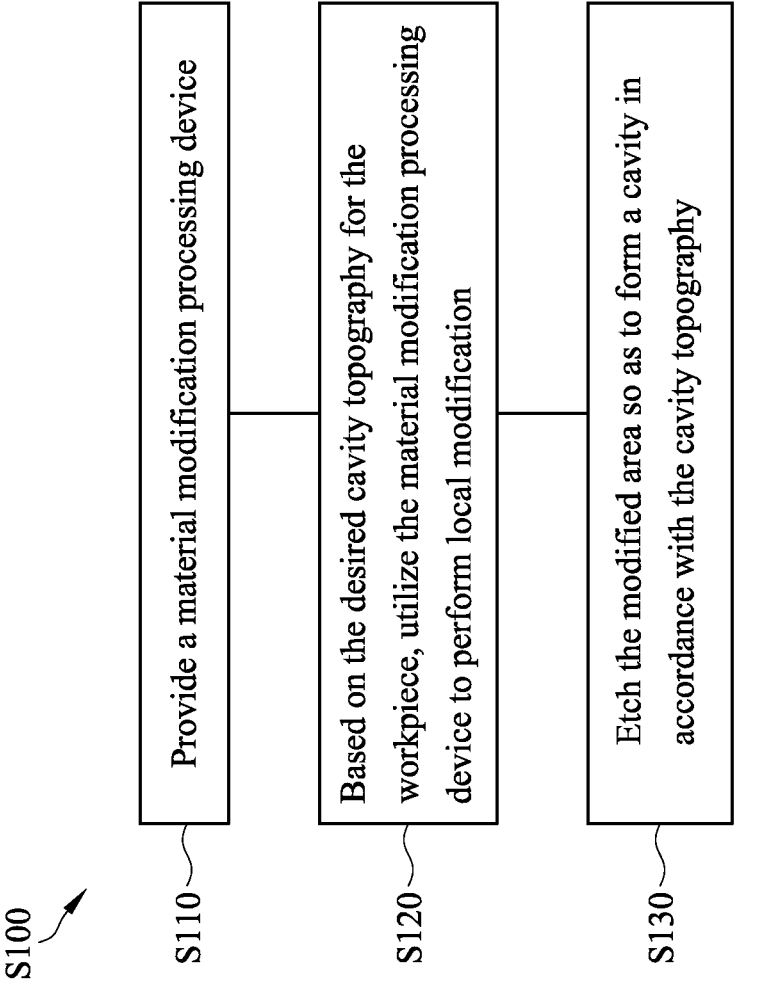
FIG. 3 is a schematic flowchart of an embodiment of the cavity forming method in accordance with this disclosure.

FIG. 3 is a schematic flowchart of an embodiment of the cavity forming method in accordance with this disclosure. As shown, also referring to FIG. 1 and FIG. 2, the cavity forming method S100 of this disclosure includes Step S110 to Step S130 as follows.

In Step S110, provide the material modification processing device 100 as shown in FIG. 1. The embodiment of the laser-light shaping and scanning processing module 130 for the material modification processing device 100 can be referred to FIG. 2 and associated descriptions.

In Step S120, according to the cavity topography formed for the workpiece 50, utilize the material modification processing device 100 to execute the local modification, including: utilizing the calculating unit 150 to calculate the laser-light shaping and scanning information LMI, utilizing the optical axis adjustment unit 140 to adjust positions of the laser-light shaping and scanning processing module 130 and the processing stage 110 so as to have an area of the workpiece 50 projected by the Bessel beam LB to form a modified area 52A, according to the laser-light shaping and scanning information LMI.

Figure 4B:
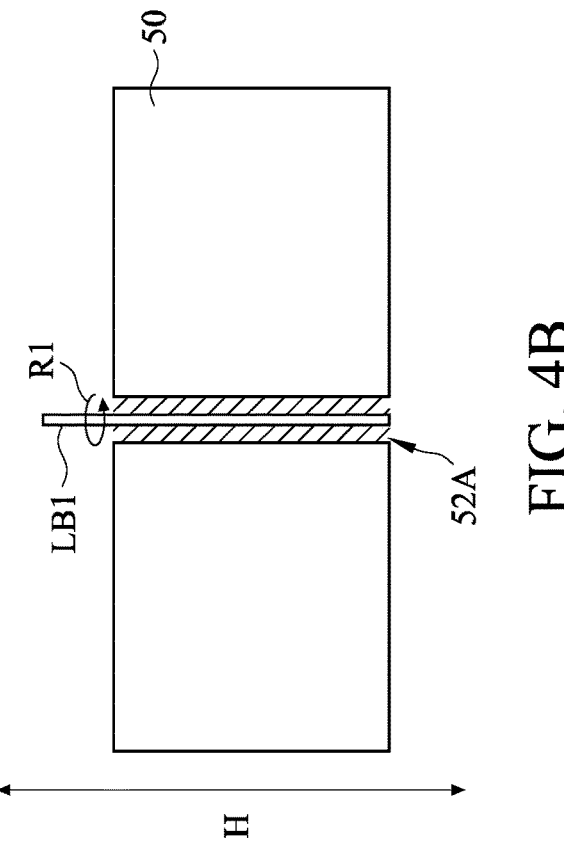
FIG. 4B is a schematic view of a processing state toward forming the workpiece of FIG. 4A.
Figure 4A:
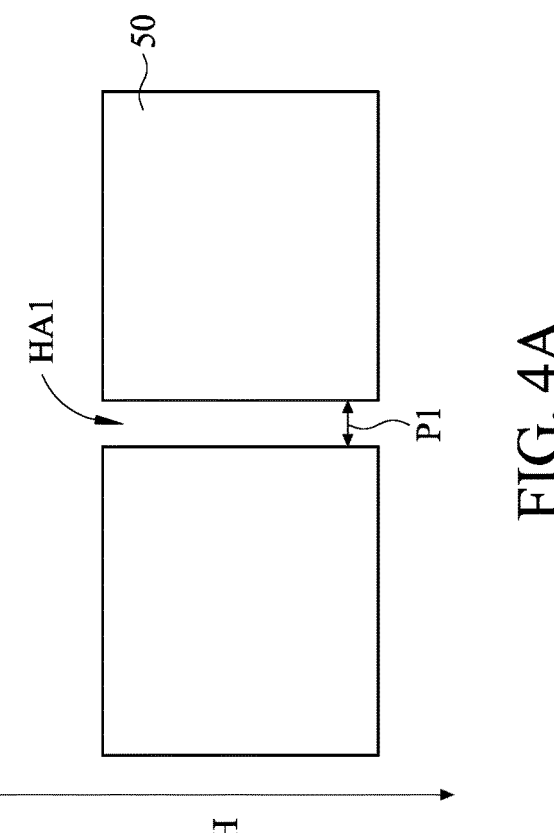
FIG. 4A shows schematically a first exemplary example of the workpiece with specific cavity topography in accordance with this disclosure.

In a first exemplary example, as shown in FIG. 4A, a cavity in the cavity topography is a through hole HAI extending in the thickness direction H to penetrate through the workpiece 50. An aperture P1 of the through hole HAI is determined up to practical processing needs. A thickness of the workpiece 50 is the distance at the workpiece 50 in the thickness direction H. Step S120 includes the following step. Referring to FIG. 4B, the laser-light shaping and scanning information LMI tells that the Bessel beam LB1 in an incident light beam directly vertical down into the work-piece 50, and the Bessel beam LB1 covers at least the thickness of the workpiece 50. By having the aperture P1 of the through hole HAI as a diameter, the Bessel beam LB1 rotates in a rotation direction R1 to form a corresponding modified area 52A.

Figure 5B:
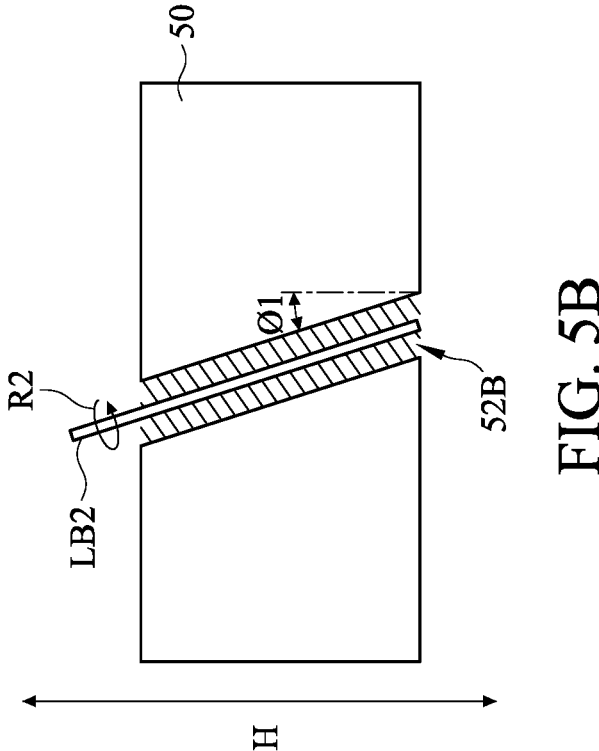
FIG. 5B is a schematic view of a processing state toward forming the workpiece of FIG. 5A.
Figure 5A:
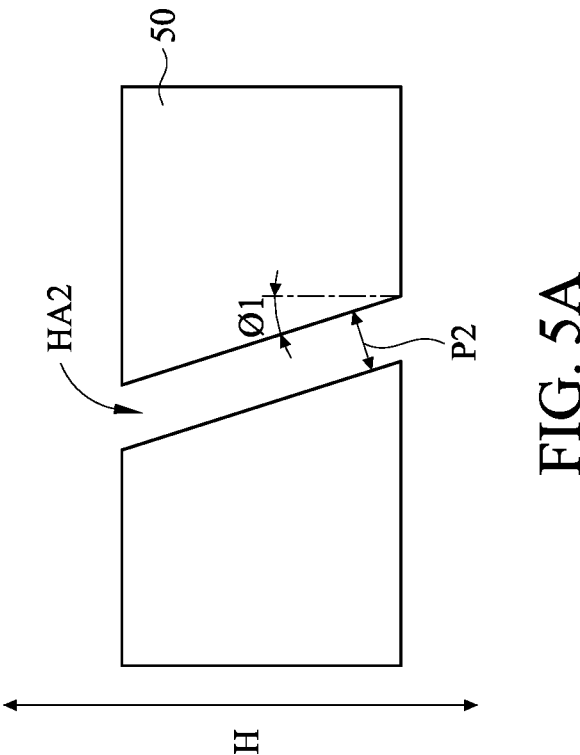
FIG. 5A shows schematically a second exemplary example of the workpiece with specific cavity topography in accordance with this disclosure.

In a second exemplary example, as shown in FIG. 5A, a cavity in the cavity topography is a through hole HA2 formed obliquely at the workpiece 50 by an angle Ø1. The angle Ø1 is proportional to the aforesaid inclined angle α; for example, the angle Ø1 can be 20°. This through hole HA2 can be used for forming a conductive-wire layer. Step S120 includes the following Steps. The laser-light shaping and scanning information LMI tells that the inclined angle of the processing stage 110 (referring to FIG. 1) is to have the workpiece 50 on the processing stage 110 to have an inclined angle (30° for example), such that the Bessel beam LB2 can be an oblique incident beam with respect to the workpiece 50. Then, as shown in FIG. 5B, the Bessel beam LB2 is obliquely led to the workpiece 50 by covering at least the thickness of the workpiece 50. By having the aperture P2 of the through hole HA2 as a diameter, the Bessel beam LB1 rotates in a rotation direction R2 to form a corresponding modified area 52B.

Figure 6B:
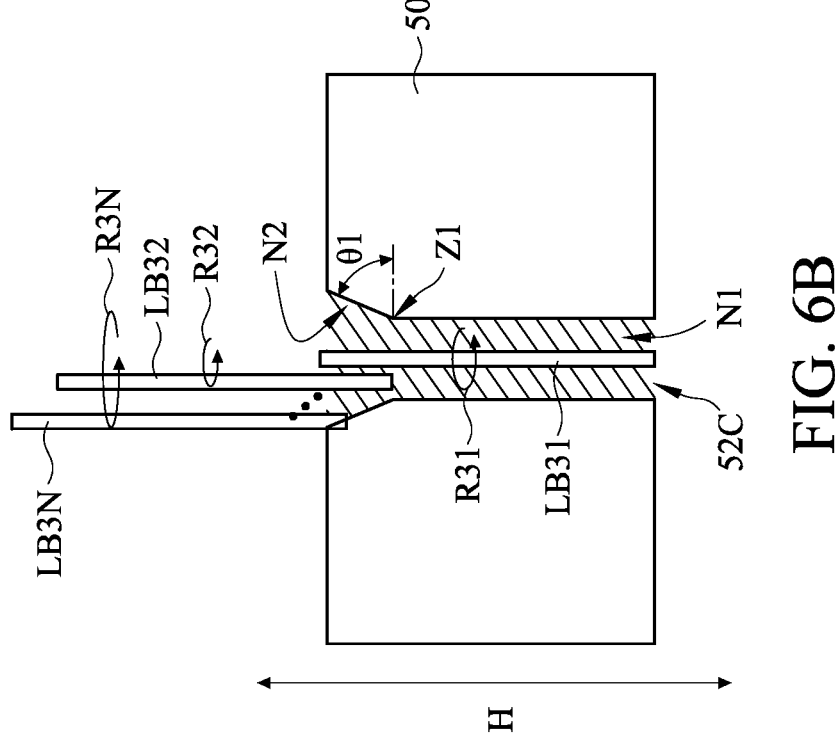
FIG. 6B is a schematic view of a processing state toward forming the workpiece of FIG. 6A.
Figure 6A:
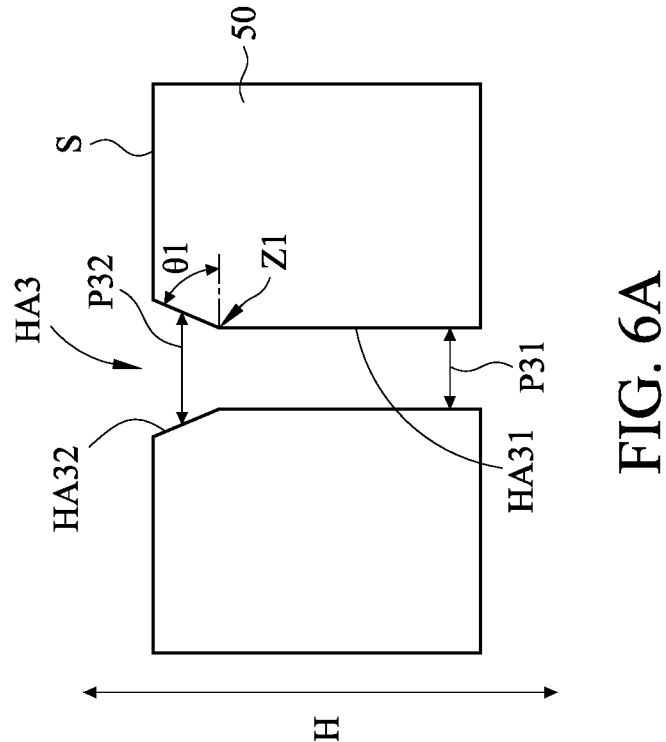
FIG. 6A shows schematically a third exemplary example of the workpiece with specific cavity topography in accordance with this disclosure.

In a third exemplary example, as shown in FIG. 6A, a cavity in the cavity topography is a through hole HA3. The through hole HA3 includes a straight portion HA31 and a bevelled portion HA32, in which an aperture P32 of the bevelled portion HA32 is greater than another aperture P31 of the straight portion H31, such that a cavity topography of the through hole HA3 is shown to have a wider upper end and a narrower lower end. In additional, in the thickness direction H, a transition position Z1 is defined between the straight portion H31 and the bevelled portion HA32. The aperture P32 of the bevelled portion HA32 is gradually enlarged from the transition position Z1 to the surface S of the workpiece 50, and the bevelled portion HA32 has an opening angle θ1 (45° for example).

Referring to FIG. 6B, Step S120 includes the following steps. According to the laser-light shaping and scanning information LMI, the Bessel beam LB31 is obliquely projected into the workpiece 50. By having the aperture P31 of the through hole HA3 of the cavity topography as a diameter, the Bessel beam LB31 is rotated in the rotation direction R31 to form a modified area N1 having the straight portion HA31. According to the topography of the bevelled portion HA32, a vertical displacement of the horizontal displacement and laser-light shaping and scanning processing module 130 of the processing stage 110, as shown in FIG. 1, can be adjusted so as to allow multiple Bessel beams LB32~LB3N able to sequentially process the workpiece 50 to finally form a modified area N2 having the bevelled portion HA32. The vertical displacement of the laser-light shaping and scanning processing module 130 can be 20 um, such that the Bessel beam LB31, the Bessel beam LB32, the Bessel beam LB3N and the other laser beam of the multiple beams can project at different positions of the workpiece 50 in the thickness direction H. In some other embodiments, the vertical displacement of the laser-light shaping and scanning processing module 130 can be adjusted to have the modified area N2 with the topography of the bevelled portion HA32 and the modified area N1 with the topography of the straight portion HA31. For example, in the case that the horizontal displacement of the processing stage 110 is 20 um, then the processing stage 110 would displace 20 um horizontally in the first direction LX, as shown in FIG. 1, such that the processing site of the Bessel beam LB32 would be different to that of the Bessel beam LB31. Then, after the displacement, the Bessel beam LB32 would scan to rotate in the rotation direction R32. With different distances of the workpiece 50 in the thickness direction H, different processing results would be obtained. Namely, by having all the multiple Bessel beams LB32~LB3N individually to follow the aforesaid processing pattern, then a countersunk hole can be formed after the Bessel beam LB3N finishes the rotating and scanning in the rotation direction R3N. It shall be explained that: the aforesaid opening angle θ1 of the aforesaid bevelled portion can be expressed by the following mathematical equation.

$$\theta 1 = \tan^{-1}\frac{\Delta Z}{\Delta r}$$

in which ΔZ is the vertical displacement, and Δr is the horizontal displacement.

Figure 7:
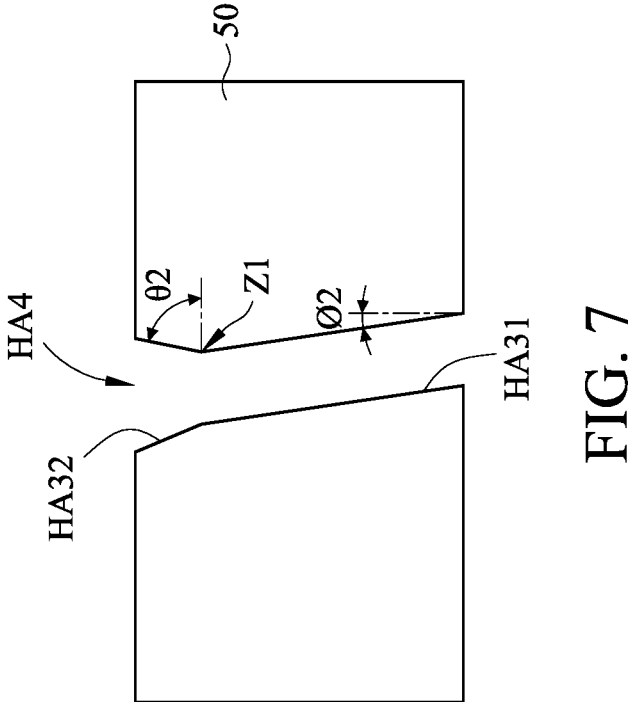
FIG. 7 shows schematically a fourth exemplary example of the workpiece with specific cavity topography in accordance with this disclosure.

In a fourth exemplary example, as shown in FIG. 7, a cavity in the cavity topography is a through hole HA4. The through hole HA4 forms an angle Ø2 with respect to the workpiece 50. In comparison with FIG. 6A, FIG. 7 is an inclined hole. In one example, the through hole HA4 can be used for an APC connector having a 8° end surface, thus the angle Ø2 between the through hole HA4 and the workpiece 50 is 8°, and Ø2∝α

$$\propto \frac{1}{n},$$

in which n stands for the refractive index of the workpiece 50. Namely, the angle Ø2 between the through hole HA4 and the workpiece 50 would be proportional to the opening angle θ2, and particularly the opening angle θ2 can be 45°. In addition, the angle θ2 between the through hole HA4 and the workpiece 50 is also related to the reflective index of the workpiece 50.

Thus, in the through hole HA4 of FIG. 7, Step S120 includes the processing steps for FIG. 6B and also those for FIG. 5A. Namely, the laser-light shaping and scanning information LMI tells to adjust the processing stage 110 to have an inclined angle as shown in FIG. 1, such that the workpiece 50 on the processing stage 110 can also have the inclined angle α, 12° for example.

Figures 8A, 8B:
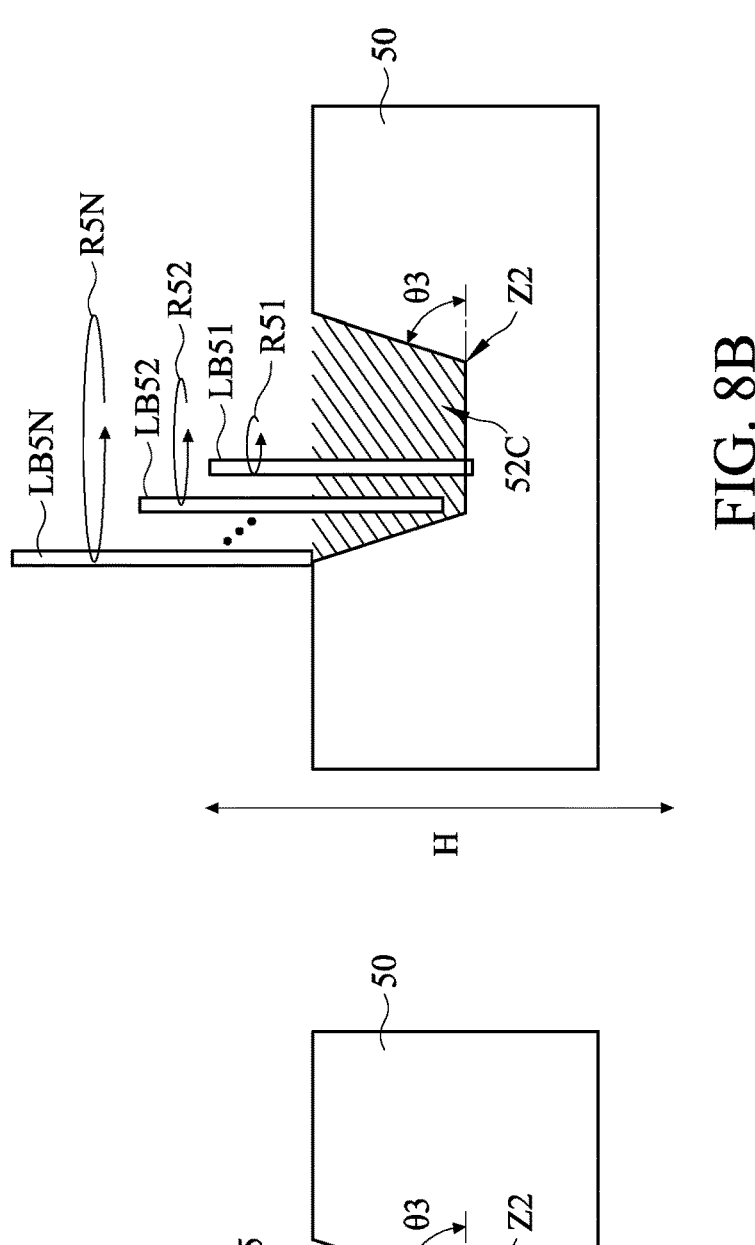
FIG. 8A shows schematically a fifth exemplary example of the workpiece with specific cavity topography in accordance with this disclosure.
FIG. 8B is a schematic view of a processing state toward forming the workpiece of FIG. 8A.

In the aforesaid first exemplary example through the fourth exemplary example, the cavity of the cavity topography is a through hole, but not limited thereto according to this disclosure. In a fifth exemplary example, as shown in FIG. 8A, the cavity of the cavity topography is a blind hole HA5 on the workpiece 50. In the thickness direction H, the blind hole HA5 has a bottom defined as an innermost position Z2 of the workpiece 50. An opening angle θ3 of the blind hole HA5 is 68.2°. Step S120 would include the following steps. The laser-light shaping and scanning information LMI (refer to FIG. 1) tells: multiple Bessel beams LB51, LB52~LB5N can be sequentially projected into the workpiece 50, and a horizontal displacement of the processing stage 110 and a vertical displacement of the laser-light shaping and scanning processing module 130 so as to have the Bessel beams LB51, LB52, LB5N individually and sequentially processing the workpiece 50 in the thickness direction H at respective sites without penetrating the workpiece 50, and adjust the horizontal displacement of the processing stage 110 so as to have the multiple Bessel beams LB51, LB52, LB5N to individually rotate in the respective rotation directions R51, R52, R5N. With different processing thicknesses at the workpiece 50 in the thickness direction H, the modified area 52C can be formed.

Referring back to FIG. 3, in Step S130, the modified area is etched to form the cavity of the cavity topography, such as the through hole HAI of FIG. 4A, the through hole HA2 of FIG. 5A, the through hole HA3 of FIG. 6A, the through hole HA4 of FIG. 7, and the blind hole HA5 of FIG. 8A. The 8°-end surface in FIG. 7 is suitable to form an APC connector. The method provided in this disclosure requires only two steps, particularly to form the oblique through hole HA4 for the APC connector. In one embodiment, the etching process can apply a wet etch having an etch tank containing an etch solution at an appropriate etching temperature. It shall be explained that the pH value of the etch solution can be ranged from 1~5 or 8~15, and the etch solution can be HF or other erodible solution, determined per practical requirements anyhow.

In summary, this disclosure can meet the needs of versatile cavity topography for various products to form easily different cavities corresponding to specific cavity topography.

Further, the Bessel beam of this disclosure has a diverging-and-converging feature, and thus the laser energy of the Bessel beam can be decayed quickly to zero. Thereupon, while in modifying a workpiece, the laser energy residual phenomenon of the Bessel beam would be reduced, a smoother surface at the workpiece would be contributed by projecting the Bessel beam, and thus possible crack after etching can be effectively reduced.

In additional, the cavity forming method provided in this disclosure can save both the cost and the labor time.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A cavity forming method, comprising the steps of:
providing a material modification processing device, wherein the material modification processing device comprises a processing stage, an optical axis adjustment unit and a laser-light shaping and scanning processing module;
according to a cavity topography to be formed in a workpiece, utilizing the material modification processing device to perform local modification including: calculating a laser-light shaping and scanning information, and adjusting, by the optical axis adjustment unit, positions of the laser-light shaping and scanning processing module and the processing stage based on the laser-light shaping and scanning information, such that the area of the workpiece to be projected by a Bessel beam is formed as a modified area; and
etching the modified area to form a cavity of the cavity topography,
wherein the cavity of the cavity topography is a through hole, the through hole includes a straight portion and a bevelled portion, and the laser-light shaping and scanning information includes:
the Bessel beam being led to project the workpiece, and rotating the Bessel beam by having an aperture of the through hole of the cavity topography as a diameter to form the modified area for the straight portion; and according to the bevelled portion, adjusting a horizontal displacement of the processing stage and a vertical displacement of the laser-light shaping and scanning processing module, sequentially processing the workpiece with the Bessel beam to form the modified area for the bevelled portion, wherein the bevelled portion has an opening angle equal to $$\tan^{-1}\frac{\Delta Z}{\Delta r},$$

$\Delta Z$ is the vertical displacement, and $\Delta r$ is the horizontal displacement.

2. The cavity forming method of claim 1, further including the step of: adjusting an inclined angle of the processing stage to project the Bessel beam obliquely, an angle between the through hole and the workpiece being proportional to the inclined angle.

3. The cavity forming method of claim 1, further including the step of: adjusting an inclined angle of the processing stage to project the Bessel beam obliquely, wherein the through hole and the workpiece are spanned to form an angle proportional to the inclined angle.

4. The cavity forming method of claim 1, wherein the cavity of the cavity topography is a blind hole, and the laser-light shaping and scanning information includes:

projecting the Bessel beam into the workpiece; and adjusting the horizontal displacement of the processing stage and the vertical displacement of the laser-light shaping and scanning processing module to have the multiple Bessel beams to sequentially process the workpiece.

5. The cavity forming method of claim 1, further including: having a ratio of a depth of field of the laser-light shaping and scanning processing module to a thickness of the workpiece to be at least greater than 1.2.

6. The cavity forming method of claim 1, further including: having a wavelength of the laser beam of the laser-light shaping and scanning processing module to be ranged from 0.5 µm to 11 µm, and an energy density of the laser beam of the laser-light shaping and scanning processing module to be ranged from 0.05 J/cm² to 0.1 J/cm².

* * * * *